US012521289B2

(12) United States Patent
Petralia et al.

(10) Patent No.: US 12,521,289 B2
(45) Date of Patent: Jan. 13, 2026

(54) EQUIPMENT FOR THE SUPPORT OF BIOMEDICAL DEVICES

(71) Applicant: EUROSETS S.R.L., Medolla (IT)

(72) Inventors: Antonio Petralia, Medolla (IT); Nicola Ghelli, Medolla (IT); Paolo Fontanili, Medolla (IT)

(73) Assignee: EUROSETS S.R.L., Medolla (IT)

( * ) Notice: Subject to any disclaimer, the term of this patent is extended or adjusted under 35 U.S.C. 154(b) by 370 days.

(21) Appl. No.: 18/264,119

(22) PCT Filed: Feb. 16, 2022

(86) PCT No.: PCT/IB2022/051379
§ 371 (c)(1),
(2) Date: Aug. 3, 2023

(87) PCT Pub. No.: WO2022/175837
PCT Pub. Date: Aug. 25, 2022

(65) Prior Publication Data

US 2024/0091081 A1 Mar. 21, 2024

(30) Foreign Application Priority Data

Feb. 18, 2021 (IT) ........................ 102021000003740

(51) Int. Cl.

| | |
|---|---|
| ***A61G 1/044*** | (2006.01) |
| ***A61G 1/04*** | (2006.01) |
| ***A61G 7/075*** | (2006.01) |

(52) U.S. Cl.
CPC ............... *A61G 1/044* (2013.01); *A61G 1/04* (2013.01); *A61G 7/0755* (2013.01)

(58) Field of Classification Search
None
See application file for complete search history.

(56) References Cited

U.S. PATENT DOCUMENTS

2003/0046764 A1 3/2003 Smeed

FOREIGN PATENT DOCUMENTS

| | | | |
|---|---|---|---|
| DE | 10 2013 017650 A1 | 4/2015 |
| FR | 2 891 453 A1 | 4/2007 |
| WO | WO 2020/152515 A1 | 7/2020 |

*Primary Examiner* — Adam C Ortiz
(74) *Attorney, Agent, or Firm* — ASLAN LAW, P.C.

(57) ABSTRACT

An equipment for the support of biomedical devices including at least one basic element associable with at least one carrying device of a patient and provided with an anchoring device/element/component/module/unit or the like of at least one biomedical device; an attachment device/element/component/module/unit or the like of the basic element to the carrying device; and at least one pair of sustaining elements to sustain the legs of the patient. The sustaining elements are associated on mutually opposite sides with the basic element.

19 Claims, 4 Drawing Sheets

EQUIPMENT FOR THE SUPPORT OF BIOMEDICAL DEVICES

CROSS-REFERENCE TO RELATED APPLICATIONS

This application claims priority to IT Patent Application No. 102021000003740 filed on Feb. 18, 2021, and this application claims priority to and is a 371 of international PCT Application No. PCT/IB2022/051379 filed on Feb. 16, 2022, the entire contents of which are hereby incorporated by reference.

TECHNICAL FIELD

The present invention relates to a piece of equipment for the support of biomedical devices.

BACKGROUND ART

Biomedical devices, such as extracorporeal blood circulation devices, e.g. oxygenators and centrifugal pumps, or other devices used in hospital practice and in emergency situations, are known to be used in hospital and out-of-hospital settings.

The use is also known of equipment adapted to support biomedical devices during the use thereof and possibly, if biomedical devices are movable, to carry them.

More specifically, while these devices are widely employed in hospital practice, their use may also be necessary in emergency situations, such as roadside interventions or in places far from equipped medical facilities.

It may happen, therefore, both in and out of hospital, that the patient undergoing extracorporeal circulation must be moved from one place to another, for example inside the hospital or to a different facility to undergo particular diagnostic tests and/or to perform emergency operations.

Because patient treatment cannot often be suspended while the patient is in transit, especially when biomedical devices are used to support the patient's vital functions, equipment for the transport of biomedical devices, such as extracorporeal blood circulation devices, is generally used.

Usually, the equipment used for the support of biomedical devices is of the type of trolleys which are placed alongside the bed and/or stretcher on which the patient to be treated is placed and which are moved when necessary.

In this case, it is therefore necessary to simultaneously move the stretcher or bed on which the patient is lying as well as the equipment supporting the biomedical devices to which the patient is linked, in order to prevent them from accidentally disconnecting from the patient.

It is easy to appreciate how such operations are difficult to perform, especially when they need to be carried out quickly as happens, for example, in emergency situations.

The use of this type of equipment also requires the presence of at least two caregivers, i.e., one in charge of moving the patient's bed and another one in charge of moving the equipment for the support of biomedical devices.

It is easy to appreciate how the aforementioned healthcare providers must coordinate their respective movements in order to meet the operational requirements just described, but these operational conditions are not always easy and quick to implement.

Even while displacing the patient to or from an emergency vehicle, it can be difficult to maintain the connection between the patient and the biomedical devices.

FR 2891453 A1 and WO 2020/152515 A1 describe the equipment of known type for the support of biomedical devices.

DESCRIPTION OF THE INVENTION

The main aim of the present invention is to devise a piece of equipment for the support of biomedical devices which allows promoting the movement of the patient and of the biomedical devices connected thereto at the same time.

Particularly, within such an aim, the present invention has the object of devising a piece of equipment for the support of biomedical devices that is small enough so as to be able to be easily used in any operating condition, both in and out the hospital.

Additionally, one object of the present invention is to devise a piece of equipment for the support of biomedical devices which allows reducing the number of healthcare providers involved in patient carrying operations, thereby reducing the time and cost required.

Another object of the present invention is to devise a piece of equipment for the support of biomedical devices which allows the mentioned drawbacks of the prior art to be overcome within the scope of a simple, rational, easy and effective to use as well as affordable solution.

The aforementioned objects are achieved by the present equipment for the support of biomedical devices having the characteristics of claim 1.

BRIEF DESCRIPTION OF THE DRAWINGS

Other characteristics and advantages of the present invention will become more apparent from the description of a preferred, but not exclusive, embodiment of a piece of equipment for the support of biomedical devices, illustrated by way of an indicative, yet non-limiting example in the accompanying tables of drawings wherein.

EMBODIMENTS OF THE INVENTION

Figure 1:
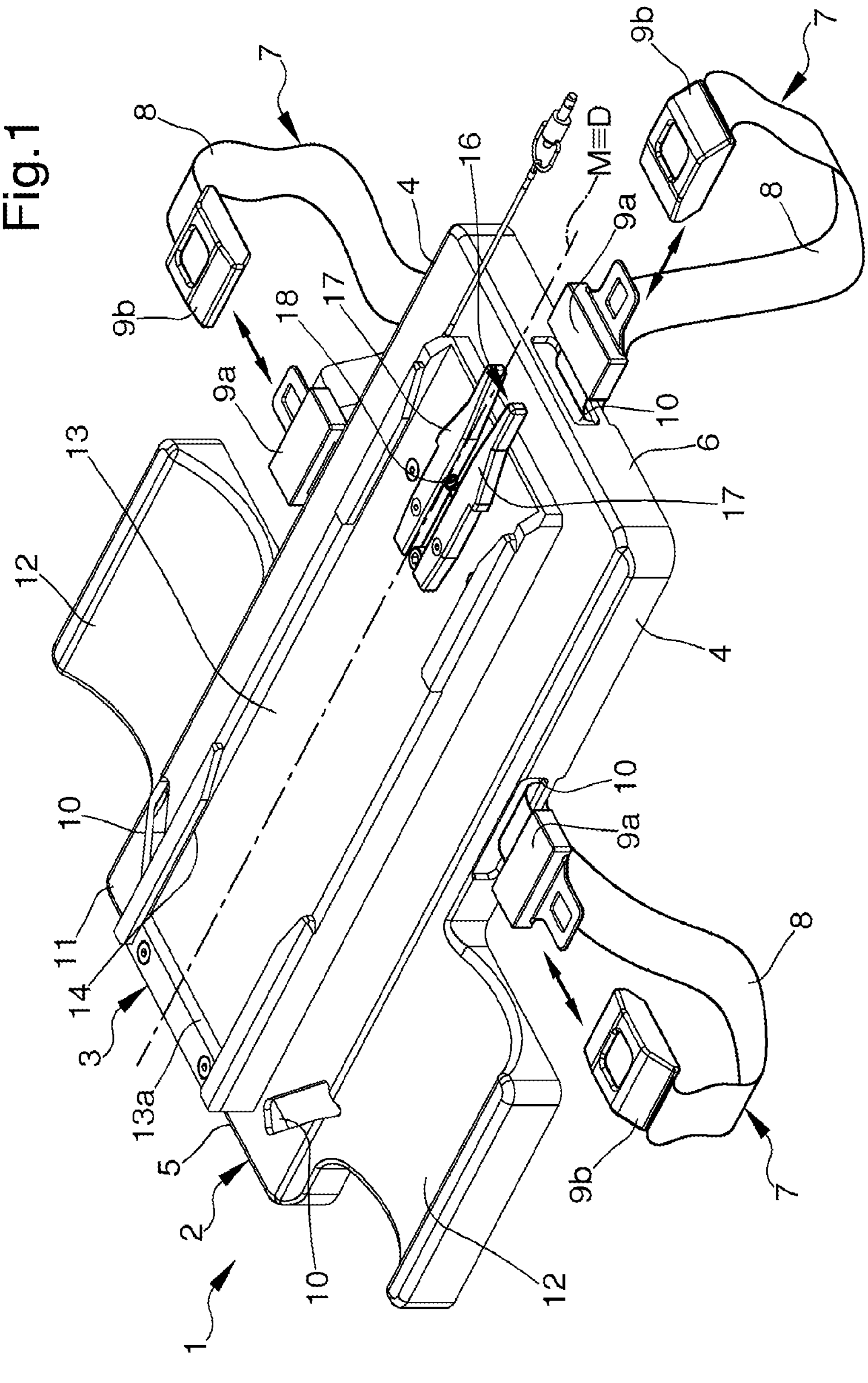
FIG. 1 is an axonometric view of a piece of equipment for the support of biomedical devices according to the invention.

With particular reference to such figures, reference numeral 1 globally indicates a piece of equipment for the support of biomedical devices.

The equipment 1 comprises at least one basic element 2 associable with a carrying device B of a patient P and provided with anchoring means 3 of at least one biomedical device O, C.

The set of carrying device B and equipment 1 defines a structure S for carrying a patient P.

The carrying device B is, e.g., of the type of a stretcher or hospital bed on which the patient P is laid.

More particularly, the carrying device B comprises a frame T having a substantially tubular conformation and defining its external profile.

Usefully, the basic element 2 has at least one median axis M and defines at least one pair of side edges 4, substantially parallel to the median axis M, at least one upper edge 5 and at least one lower edge 6 arranged transversely with respect to the median axis M.

Particularly, the basic element 2 has an elongated shape and the median axis M coincides with the longitudinal axis of the basic element 2 itself.

According to the invention, the equipment 1 comprises attachment means 7 of the basic element 2 to the carrying device B.

Preferably, the attachment means 7 are of the removable type, i.e., they are adapted to attach the basic element 2 to the carrying device B in a removable manner Thus, the attachment means 7 are adapted to allow anchoring and removing the basic element 2 to the carrying device B.

Advantageously, the attachment means 7 comprise one or more attachment elements 8 made of flexible material, associated with the basic element 2 and of the closable type.

More particularly, in the embodiment shown in the figures, the attachment elements 8 are shaped as a tape.

Preferably, the attachment means 7 comprise a plurality of attachment elements 8 associated with the basic element 2 in areas different to each other so as to constrain the basic element itself integrally to the carrying device B.

Conveniently, each of the attachment elements 8 is provided with closure means 9*a*, 9*b* connectable to each other in a removable manner so as to define a corresponding closed profile.

More specifically, the closure means 9*a*, 9*b* comprise a first closure element 9*a* and a second closure element 9*b* movable between an open configuration, in which they are disengaged from each other to define an open profile, and a closed configuration, in which they are mutually coupled to define a closed profile.

Appropriately, each attachment element 8 has two free ends.

The closure means 9*a*, 9*b* may be arranged at the point where the free ends are located or in intermediate areas positioned between them.

Preferably, the closure means 9*a*, 9*b* are of the interlocking type, wherein one of either the first closure element 9*a* or the second closure element 9*b* is insertable by snapping one inside the other.

Specifically, the closure means 9*a*, 9*b* are of the type of a snap buckle wherein one of either the first closure element 9*a* or the second closure element 9*b* is of the type of a male element which can be insertable by pressure inside the other of either the first closure element 9*a* or the second closure element 9*b* which is of the type of a female element.

During the use of the equipment 1, the closure means 9*a*, 9*b* are brought from the open configuration to the closed configuration once their free ends have been wrapped around the carrying device B, which is then inserted inside the closed profile thus obtained.

Preferably, the attachment elements 8 are provided with corresponding adjustment means for adjusting the length of the respective closed profile.

The adjustment means may be, e.g., of the type of a buckle or the like, movable along the corresponding attachment element 8 to vary the extension of the corresponding closed profile so as to increase or decrease the adherence thereof to the carrying device B.

In this way, it is possible to anchor the basic element 2 to the carrying device B so as to avoid their mutual displacement in use.

Usefully, the basic element 2 comprises one or more slots 10 inside which relevant attachment elements 8 are inserted.

In the embodiment shown in the figures, at least one of the slots 10 is defined at each of the side edges 4.

Preferably, the basic element 2 comprises at least one slot 10 defined at the point where the lower edge 6 is located.

Advantageously, the basic element 2 has at least one abutment surface 11 supporting the anchoring means 3 and at least one of the slots 10 is defined on the abutment surface 11.

More in detail, the basic element 2 has at least two slots 10 defined on the abutment surface 11, arranged on opposite sides with respect to the median plane and inclined with respect to the median plane itself.

Appropriately, such slots 10 defined on the abutment surface 11 are arranged in the proximity of the upper edge 5, in order to ensure as stable an anchorage as possible to the carrying device B.

Usefully, the abutment surface 11 is arranged transversely with respect to the edges 4, 5, 6.

More particularly, the edges 4, 5, 6 extend perpendicularly to the abutment surface 11.

Also according to the invention, the equipment 1 comprises at least one pair of sustaining elements 12 to sustain the legs of the patient P, wherein the sustaining elements 12 are associated on mutually opposite sides with the basic element 2.

Conveniently, the sustaining elements 12 are arranged on mutually opposite sides with respect to the median axis M and are arranged in the proximity of the upper edge 5.

In use, the basic element 2 is placed resting on the carrying device B and is arranged between the legs of the patient P so that the upper edge 5 and the lower edge 6 face towards the head and feet of the patient P, respectively.

Precisely, each sustaining element 12 is associated with the basic element 2 along a respective side edge 4, so as to accommodate the legs of the patient P during the use of the equipment 1.

Advantageously, each of the sustaining elements 12 defines a relevant concave seat, the concavity of which faces, in use, upwards, intended to receive a leg of the patient when lying on the carrying device B.

The anchoring means 3, with which the basic element 2 is provided, allow one or more biomedical devices O, C to be associated with the basic element itself.

The biomedical devices O, C comprise, e.g., an oxygenator O and the relevant pumping unit C for the extracorporeal blood circulation, which are associated with a supporting structure A associated with the anchoring means 3 in a removable manner.

Conveniently, the anchoring means 3 comprise at least one rail element 13 associated with the basic element 2 and defining a rail seat 14 extending along a direction of sliding D.

In the particular embodiment shown in the figures, the rail element 13 is locked together with the basic element 2 and the direction of sliding D is substantially coincident with the median axis M.

The rail seat 14 is intended to receive by shift at least one anchoring element 15 associable with the biomedical devices O, C and comprises removable locking means 16 of the anchoring element 15 associated with the rail element 13.

Preferably, two anchoring elements 15 associated with the supporting structure A of the biomedical devices O, C are provided at the point where the bottom wall thereof is located.

Figure 2:
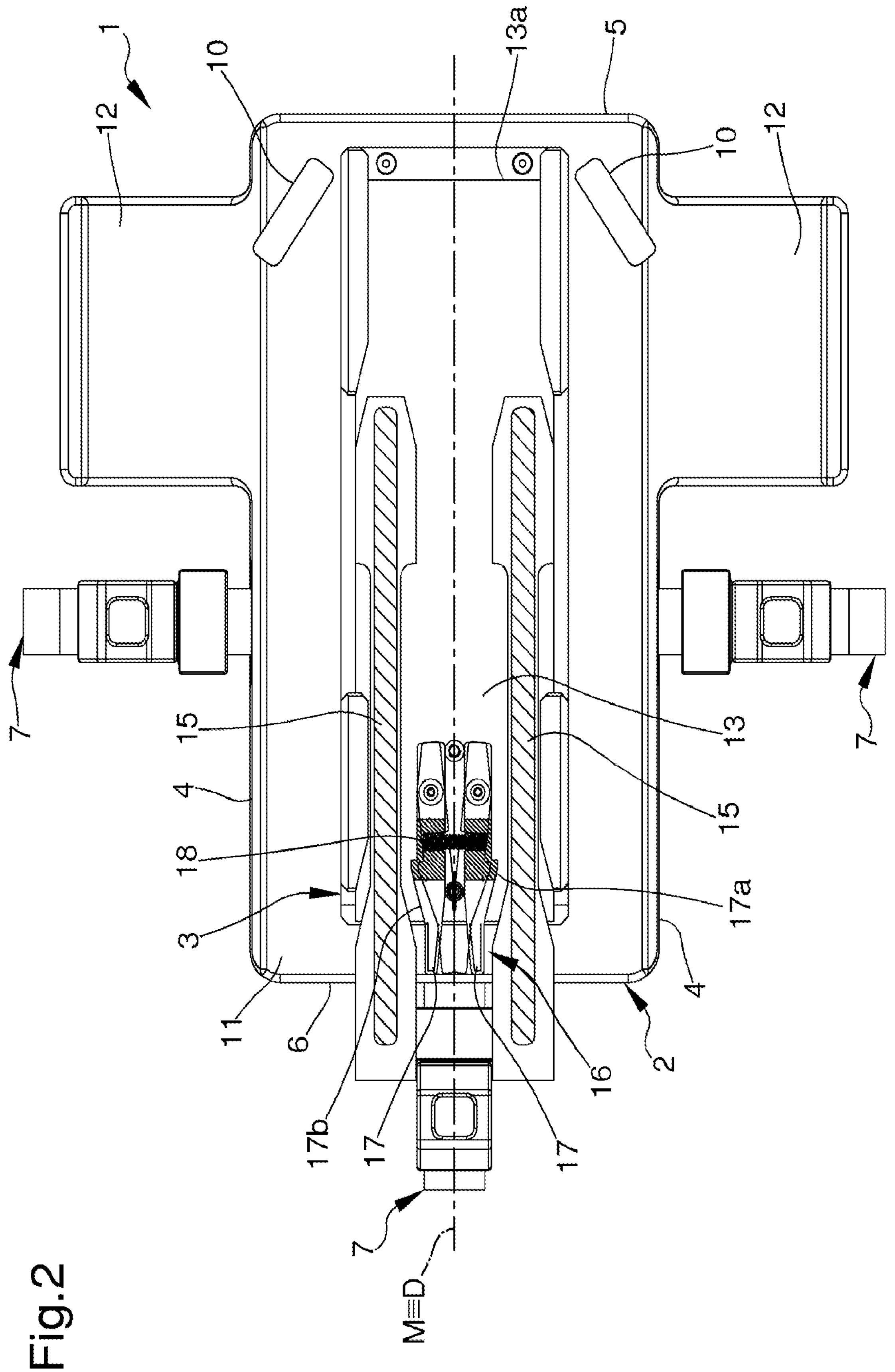
FIG. 2 is a plan view from above of a piece of equipment for the support of biomedical devices according to the invention associated with anchoring elements.
Figure 3:
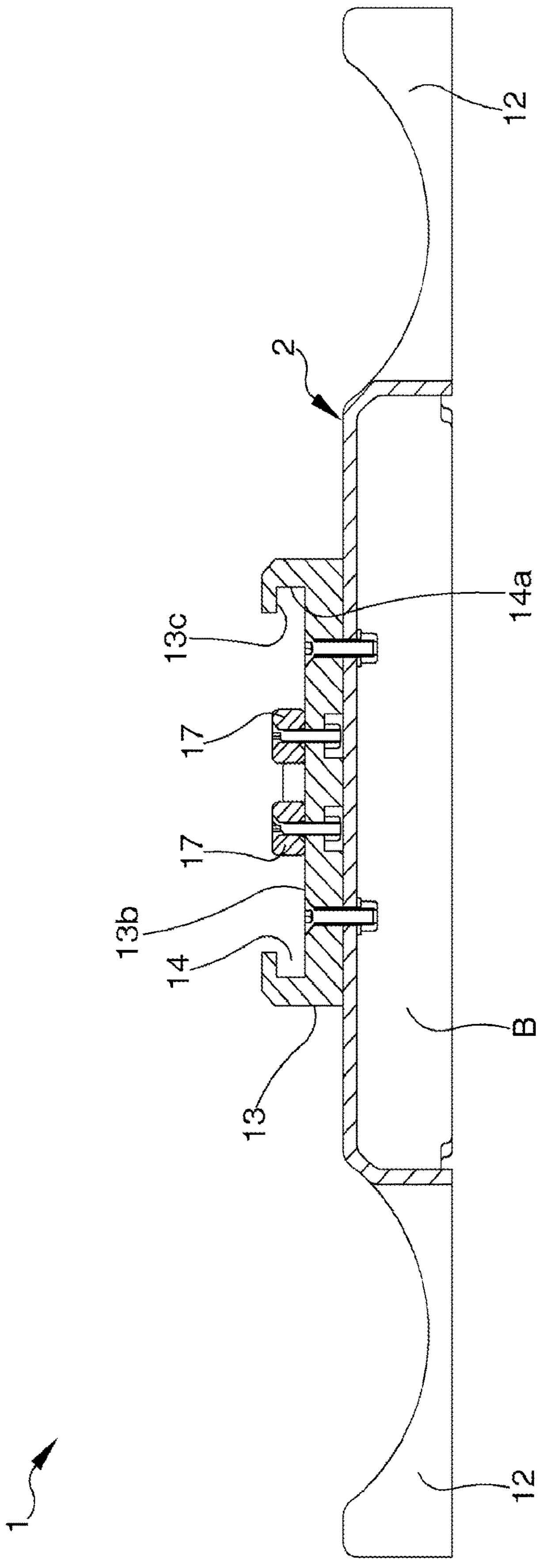
FIG. 3 is a cross-sectional view of a piece of equipment for the support of biomedical devices according to the invention associated with a partly shown carrying device.
Figure 4:
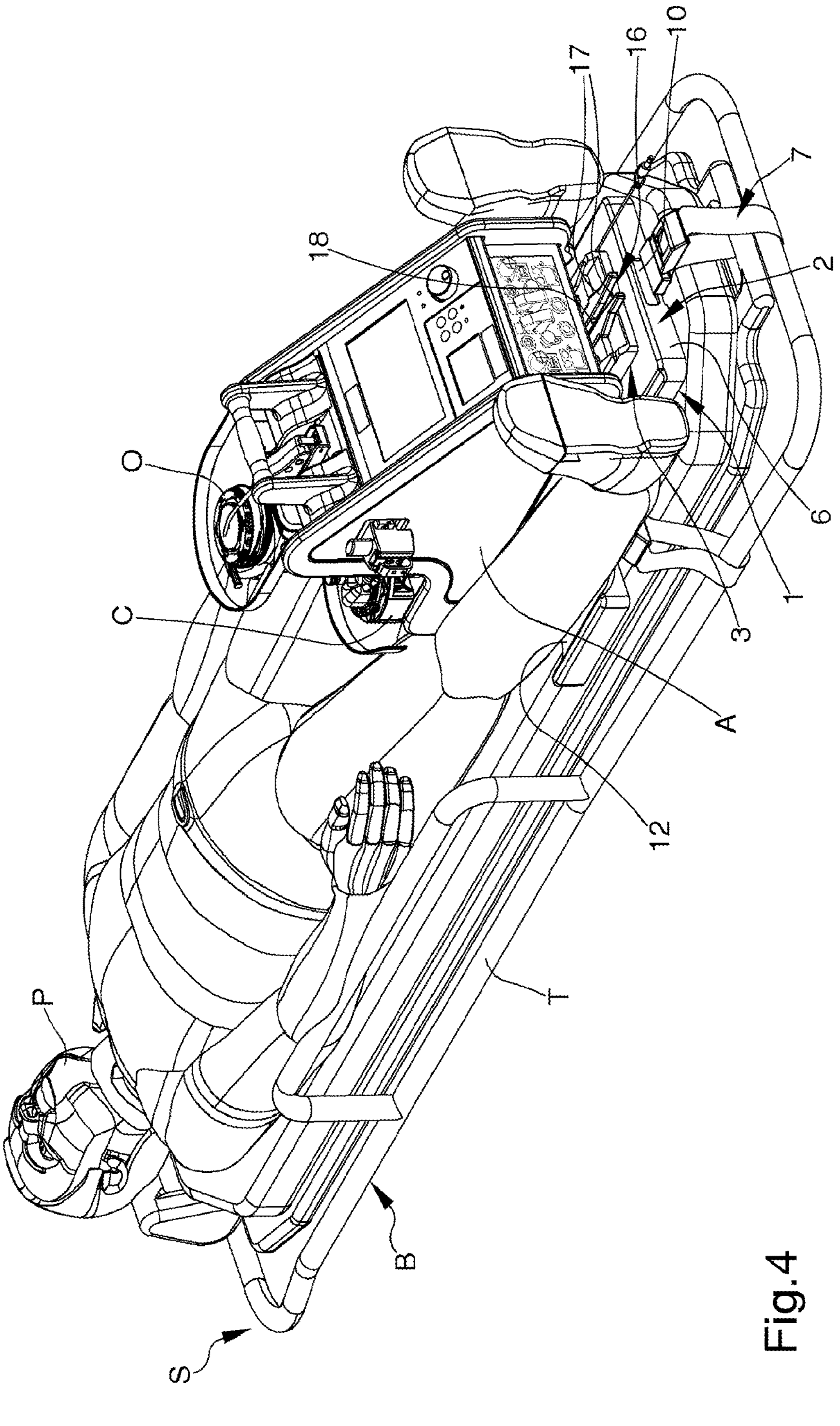
FIG. 4 is an axonometric view of a patient transport facility provided with a piece of equipment for the support of biomedical devices according to the invention.

The anchoring elements 15 are shown with a dashed drawing line in FIG. 2.

The locking means 16 lock the anchoring element 15 with respect to the basic element 2 along the direction of sliding D upon reaching a predefined anchoring position.

The predefined anchoring position corresponds, e.g., to the end-of-stroke position of the anchoring element 15 on the rail element 13.

Usefully, the rail element 13 has a stopping surface 13*a* arranged transversely to the direction of sliding D and intended to interact with the anchoring element 15 to define the predefined anchoring position.

In other words, the predefined anchoring position corresponds to the position taken by the anchoring element 15 when it leans against the stopping surface 13*a*.

Advantageously, the rail element 13 defines at least one resting surface 13*b* adapted to support the anchoring element 15 and at least one anchoring surface 13*c* arranged facing the resting surface 13*b* and adapted, in use, to prevent the anchoring element 15 from lifting with respect to the rail element 13.

In more detail, the rail seat 14 is substantially C-shaped and is bounded superiorly by the anchoring surface 13*c*.

In other words, the anchoring element 15 is adapted to engage by shifting with the rail element 13 along the direction of sliding D by fitting inside the rail seat 14.

The rail seat 14 also defines a side retaining wall 14*a* arranged contiguous and transverse to the anchoring surface 13*c*.

Preferably, the locking means 16 comprise at least one locking element 17 movable between a locking position, wherein it is adapted to interact with the anchoring element 15 to prevent the displacement thereof along the direction of sliding D, and a release position, wherein it allows the displacement of the anchoring element 15 along the direction of sliding D.

Conveniently, the locking means 16 comprise elastic means 18 adapted to counteract the displacement of the locking element 17 from the locking position towards the release position.

More particularly, the locking element 17 is adapted to displace from the locking position to the release position as a result of the sliding of the anchoring element 15 towards the predefined anchoring position and is adapted to displace, as a result of the action of the elastic means 18, from the release position to the locking position as a result of the attainment of the predefined anchoring position.

The locking element 17 is then pushed to the release position as a result of the interaction with the anchoring element 15 during the forward movement of the latter to the predefined anchoring position, while it independently displaces to the locking position when the anchoring element 15 reaches such a predefined anchoring position.

Advantageously, the locking element 17 has at least one locking surface 17*a* adapted to interact with the anchoring element 15 in the predefined anchoring position so as to prevent it from displacing along the direction of sliding D and at least one contact surface 17*b* arranged inclined with respect to the direction of sliding D and adapted to interact with the anchoring element 15 during the displacement thereof by approaching the predefined anchoring position; the locking element 17 is thus adapted to displace from the locking position to the release position as a result of the interaction of the anchoring element 15 with the contact surface 17*b*.

More particularly, as a result of the interaction of the anchoring element 15 with the locking element 17, a force having a transverse component with respect to the direction of sliding D is generated which causes the elastic means 18 to compress.

Advantageously, the locking means 16 comprise at least two locking elements 17, which are spaced apart from each other in the locking position with respect to the release position.

The elastic means 18 are positioned between the locking elements 17 and are adapted to push them towards their respective locking positions.

Appropriately, the contact surfaces 17*b* of the locking elements 17 are arranged diverging from each other outwardly moving close to the predefined anchoring position.

The operation of the present invention is as follows.

First, the basic element 2 is positioned on the carrying device B so that the lower edge 6 is turned towards the end of the carrying device itself intended to receive the feet of the patient P.

Additionally, the concavity of the sustaining elements 12 is turned upwards.

Next, the basic element 2 is anchored to the carrying device B, by letting each attachment element 8 pass, the closure means 9*a*, 9*b* of which are arranged in an open configuration, around a corresponding portion of the carrying device B.

Once each attachment element 8 has been arranged around the carrying device B, the corresponding closure means 9*a*, 9*b* are brought to the closed configuration so that the carrying device B is contained inside the closed profiles thus defined.

If necessary, the adjustment means must be adjusted so that the attachment elements 8 adhere to the carrying device B in order to prevent unwanted relevant displacements.

At this point the patient can be positioned on the carrying device by placing their legs on the sustaining elements 12.

Next, the supporting structure A of the biomedical devices is attached to the basic element 2.

More in detail, once the anchoring elements 15 applied to the bottom of the supporting structure A of the biomedical devices O, C have been aligned with the rail element 13, the anchorage elements themselves are made to move forward along the direction of sliding D.

The anchoring elements 15 then interact with the locking elements 17, and in particular with the relevant contact surfaces 17*b*, displacing them from the locking position to the release position.

Once the anchoring elements 15 have reached the predefined anchoring position, the locking elements 17 automatically displace, as a result of the action of the elastic means 18, to the locking position, where the corresponding locking surface 17*a* interacts with the corresponding anchoring element 15 thus preventing this from displacing along the direction of sliding D.

At the same time, the anchoring surface 13*c* prevents the anchoring elements 15 from being lifted.

In the event of the biomedical devices O, C having to be removed or moved with respect to the basic element 2, the locking elements 17 are manually displaced from the locking position to the release position so that the anchoring elements 15 can be moved in the direction of sliding D away from the predefined anchoring position.

It has in practice been ascertained that the described invention achieves the intended objects, and in particular the fact is emphasized that the equipment covered by the present invention allows promoting the simultaneous movement of the patient and of the biomedical devices connected thereto.

In fact, the particular expedient of providing a basic element provided with both sustaining elements to support the patient's legs and with anchoring means of the biomedical devices, allows the patient to be easily positioned on any carrying device, such as a bed, a stretcher or the like, thus minimizing the overall dimensions and promoting the simultaneous movement of the patient and of the equipment necessary to provide them with adequate medical care.

The invention claimed is:

1. An equipment for the support of biomedical devices, said equipment comprising:

at least one basic element associable with at least one carrying device of a patient and provided with anchoring means of at least one biomedical device;

attachment means of said basic element to said carrying device;

at least one pair of sustaining elements to sustain the legs of the patient, wherein said sustaining elements are associated on mutually opposite sides with said basic element.

2. The equipment according to claim 1, wherein said attachment means are of the removable type.

3. The equipment according to claim 2, wherein said attachment means comprise one or more attachment elements made of flexible material, associated with said basic element and of the closable type.

4. The equipment according to claim 3, wherein said attachment elements are provided with closure means connectable to each other in a removable manner so as to define a closed profile.

5. The equipment according to claim 1, wherein said basic element comprises one or more slots inside which relevant attachment elements are inserted.

6. The equipment according to claim 1, wherein said basic element has at least one median axis and defines at least one pair of side edges, substantially parallel to said median axis, at least one upper edge and at least one lower edge arranged transversely with respect to said median axis M.

7. The equipment according to claim 6, wherein said basic element has an elongated shape and that said median axis coincides with the longitudinal axis of the basic element.

8. The equipment according to claim 7, wherein at least one of said slots is defined at each of said side edges.

9. The equipment according to claim 8, wherein at least one of said slots is defined at said lower edge.

10. The equipment according to claim 9, wherein said basic element has at least one abutment surface supporting said anchoring means and at least one of said slots is defined on said abutment surface.

11. The equipment according to claim 10, wherein said abutment surface is arranged transversely with respect to said edges.

12. The equipment according to claim 11, wherein each of said sustaining elements defines a relevant concave seat intended to receive a leg of the patient.

13. The equipment according to claim 12, wherein said sustaining elements are arranged on mutually opposite sides with respect to said median axis and are arranged in the proximity of said upper edge.

14. The equipment according to claim 1, wherein said anchoring means comprise at least one rail element associated with said basic element and defining a rail seat extending along a direction of sliding, said rail seat being intended to receive by shift at least one anchoring element associable with one or more biomedical devices and comprising removable locking means of said anchoring element associated with said rail element, said locking means locking said anchoring element with respect to said basic element along said direction of sliding upon reaching a predefined anchoring position.

15. The equipment according to claim 14, wherein said rail element has a stopping surface arranged transversely to said direction of sliding and intended to interact with said anchoring element to define said predefined anchoring position.

16. The equipment according to claim 15, wherein said rail element defines at least one resting surface adapted to support said anchoring element and at least one anchoring surface arranged facing said resting surface and adapted, in use, to prevent said anchoring element from lifting with respect to said rail element.

17. The equipment according to claim 16, wherein said locking means comprise at least one locking element movable between a locking position, wherein the locking element is adapted to interact with said anchoring element to prevent the displacement thereof along said direction of sliding and a release position, wherein the locking element allows the displacement of said anchoring element along said direction of sliding.

18. A structure for carrying a patient comprising at least one carrying device of a patient and comprises at least one piece of said equipment for the support of biomedical devices according to claim 1 associated in a removable manner with said carrying device.

19. An equipment for the support of biomedical devices, said equipment comprising:

at least one basic element associable with at least one carrying device of a patient and provided with an anchor of at least one biomedical device;

an attachment element of said basic element to said carrying device; and at least one pair of sustaining elements to sustain the legs of the patient, wherein said sustaining elements are associated on mutually opposite sides with said basic element.

* * * * *